United States Patent [19]
Yuasa et al.

[11] 4,397,553
[45] Aug. 9, 1983

[54] PHOTOGRAPHIC SPOT MEASURING APPARATUS

[75] Inventors: Yoshio Yuasa, Kawachinagano; Kazuhiko Naruse, Sakai, both of Japan

[73] Assignee: Minolta Camera Kabushiki Kaisha, Osaka, Japan

[21] Appl. No.: 209,006

[22] Filed: Nov. 21, 1980

[30] Foreign Application Priority Data

Nov. 27, 1979 [JP] Japan .................................. 54-153913

[51] Int. Cl.³ .............................................. G01J 1/44
[52] U.S. Cl. .................................. 356/226; 354/23 R
[58] Field of Search ............... 356/218, 221, 219, 226, 356/227; 354/41, 23 R, 50, 51, 60 R, 31

[56] References Cited

U.S. PATENT DOCUMENTS

4,176,955 12/1979 Yamada et al. ..................... 356/222
4,182,573 1/1980 Yamada et al. ..................... 354/31

Primary Examiner—Bruce Y. Arnold
Attorney, Agent, or Firm—Watson, Cole, Grindle & Watson

[57] ABSTRACT

A photographic spot measuring device for determining a film exposure for an object relative to a film latitude and which is capable of reproducing various parts of the object with possible respective densities between a pair of density limits is disclosed. The device operates by selectively measuring the luminance of a desired part of the object within a limited acceptance angle and producing a light measuring signal in response thereto and generating a limit exposure signal to effect an exposure of the film in which the measured part of the object is reproduced on the film within the density limits.

18 Claims, 5 Drawing Figures

PHOTOGRAPHIC SPOT MEASURING APPARATUS

BACKGROUND OF THE INVENTION

1. Field of the Invention

The present invention relates to light measuring devices for use in exposure meters and to such light measuring devices which are assembled into auto exposure cameras for photography.

2. Description of the Prior Art

Light measuring devices generally used for photography generate exposure data signals (e.g., the combination of an aperture size and an exposure time) in response to a light measuring output representative of some average of the various luminance values distributed within a light measuring range, whereby a part of an object having a luminance value corresponding to the average value is reproduced in an approximately middle density of the reproducible density on a film (i.e., inside the film latitude). The combination of aperture size and exposure time is automatically determined by a camera in response to such an exposure data signal, or a photographer reads the display value of the exposure data signal and manually sets the exposure data for photography. Consequently, part of the object having a luminance value greater than the average value is reproduced at a higher density on the film (i.e., brighter when seen through the positive), while another part of the object having a luminance value smaller than the average value is reproduced at a lower density on the film (i.e., darker when seen through the positive). The above-described conventional exposure value determination method is based on the principle that the average of the luminance values is correlated with the center of a film latitude so that a majority of luminance values for various parts of the object are expected to be reproduced on a film in the corresponding density distribution, since the majority of luminance values disperse around the average value. The so-called correct exposure in the prior art is thus determined.

In fact, however, the above-mentioned conventional exposure value determination method does not always provide correct exposure. When the luminance distribution of an object is, for example, wider in range than the film latitude, parts of the object with less luminance than a lower limit appear black in the shadow of almost uniform density in the positive print, according to the conventional exposure determination method, although they originally have a variety of density distributions. However, parts of the object with more luminance than an upper limit turn white and disappear in the highlight of almost uniform density in the positive print, and their luminance distribution is not reproduced. If, under this condition, a photographer intends to reproduce a relatively low luminance range of the object or a relatively high luminance range of the object on a film, such results no longer correspond to correct exposure, despite the "correct" reproduction of a middle luminance range of the object.

Furthermore, when the luminance distribution of an object is narrower than the film latitude, the object is generally reproducible as an overall bright picture or an overall dark picture, depending on the composition intended by the photographer. According to the conventional exposure determination method, however, an object is always reproduced as a picture of neutral brightness regardless of the intention of the photographer, resulting in an exposure which is not correct. (A negative film permits the addition of a composition intended by the photographer during printing, whereas a reversal film does not.)

In such a case, correct exposure is not obtainable from a "so-called correct exposure value". Therefore, photography may be performed with an exposure value which is intentionally shifted from the "so-called correct exposure value". However, the amount it is shifted depends entirely upon the experience of an individual photographer, ensuring no reproduction of a luminance distribution as intended.

Moreover, there is a photographic spot measurement known as a method for obtaining detailed luminance information of an object, in which the luminance of only a limited area of the object is measured. According to the spot measuring method, it is possible to measure not only an average luminance of the entire object but also the luminance of the individual parts of an object, thereby providing luminance information of any desired part alone, as well as the differences in luminance between the darkest and brightest parts.

With photographic spot measurement, however, an exposure data signal is generated so that the luminance of the measured part of an object may be reproduced almost in the middle density within the film latitude. Thus, although different in that the light measuring range is narrow, the above-described photographic spot measurement method is substantially based on the technical concept identical to that of the so-called correct exposure value determination method using an average luminance of the whole object. Specifically, the part to be spot-light-measured is reproduced in the middle density, a part with more luminance than the spot-light-measured part being reproduced at higher density and another part with less luminance at a lower density. Thus, these two methods are apparently based on the same technical concept when the "luminance of a part to be spot-light-measured" reads as the "average of luminance of the whole object".

SUMMARY OF THE INVENTION

Accordingly, the primary object of the present invention is to provide a new photographic light measuring device which improves conventional light measuring devices and permits the output of an exposure data signal which provides truly correct exposure in accordance with an intended photographic composition, thereby offering enhanced convenience for photography.

The present invention is characterized in that a spot-light measuring means is combined with a means which generates an exposure data signal by which the spot-measured part of an object is reproduced almost in the limit density, i.e., the maximum or minimum density of the film latitude.

More specifically, the present invention provides a novel concept of measurement of light for a part which is intended to be reproduced in the maximum or minimum density on the film (i.e., as the highlight or shadow part) in place of a conventional spot-light measurement for a part of an object to be reproduced in middle density on the film. In response to such a novel concept of spot measurement, the device according to the present invention generates an exposure data signal by which the spot-measured part is reproduced in the maximum or minimum density. Consequently, when a part which is intended as a highlight portion of the print is spot-measured by the device of the present invention, and exposure is performed in response to the output of an exposure data signal (the device, in this case, generates exposure information for effecting the maximum density, i.e., an exposure data signal which provides a density corresponding to the highlight portion in terms of the positive print), the spot-light-measured part is reproduced as a highlight portion as intended. Since the luminances for other parts are lower than that for the spot-light-measured part according to the intended photographic composition, they are certain to be inside the film latitude and are reproduced in their corresponding density. It may be of course expected that parts with insufficient luminances may go beyond the minimum density of the film latitude, and they are not reproduced with their original luminance distribution. However, this poses no problem since interest in the intended photographic composition resides in the reproduction of a luminance distribution in the high luminance range. However, when a luminance distribution in the low luminance range is intentionally reproduced, a part of an object which is intended as a shadow portion of the print is spot-measured by the device of the present invention to obtain exposure information for the minimum density, thereby similarly assuring photography as intended.

With an embodiment of the present invention, an exposure data signal to reproduce the measured part in middle density is first obtained so that the device is also capable of conventional spot-measuring. Additionally, the exposure data signal for middle density and steps of exposure values corresponding to almost half of the film latitude are combined to create an exposure data signal for the maximum or minimum density.

It is to be noted, however, that the above embodiment is one of the various types embodying the present invention, and that the same result may be obtained by another embodiment in which an exposure data signal by which the spot-measured part is reproduced in the minimum density is first obtained, and an exposure data signal for middle density, or an exposure data signal for the maximum density is created by the combination of the exposure data signal for the minimum density with the steps of exposure values corresponding almost to half of the film latitude, or with steps of exposure values corresponding to the film latitude, respectively. In contrast, the same result as that of the above embodiments is possible by an embodiment which first obtains the exposure data signal for maximum density in a similar manner as that in the second mentioned embodiment.

Moreover, when the luminance distribution of an object is narrower in range than the film latitude, a part intended for the shadow portion of the print is spot-measured by the device in accordance with the present invention to obtain an exposure data signal for minimum density, whereby an overall dark photograph is possible as intended.

It should be understood that the maximum or minimum density as referred to above represents the upper or lower limit which can maintain a linear relationship between the changes in exposure value and film density, and that the film latitude means the steps of exposure values corresponding to the range defined between maximum and minimum density, the latitude of ordinary films being almost constant, regardless of their type.

DETAILED DESCRIPTION OF THE PREFERRED EMBODIMENTS

Figure 1:
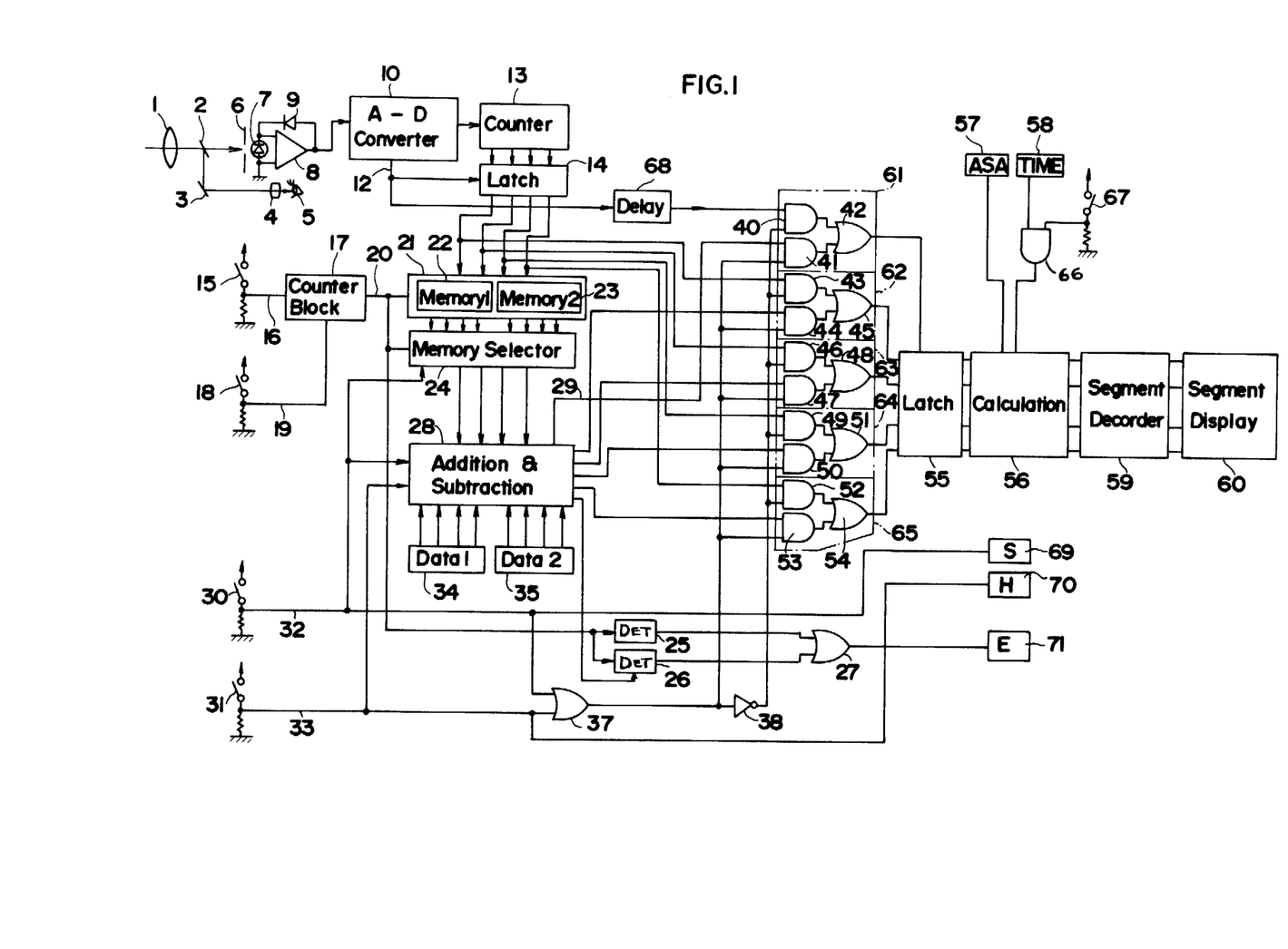
FIG. 1 is a block diagram of a first embodiment of the present invention.

FIG. 1 shows a block diagram of a first embodiment of the present invention. The block diagram includes a spot-measuring optical system comprising elements 1, 2, 3, 4 and 6, which receives the light from a limited area of an object. A photoelectric converter circuit consisting of elements 7, 8 and 9 converts the light from the optical system into a voltage. An A-D converter circuit composed of A-D converter 10, counter 13 and latch 14, converts an analog output from the photoelectric converter circuit (including elements 7, 8 and 9) into a digital signal. Memory circuit 21 having memory circuits 22 and 23 stores an output from the A-D converter circuit (including A-D converter 10, counter 13 and latch 14) when external switch 15 is turned ON. Memory selector 24 determines the selection between the two memory circuits 22 and 23 in memory circuit 21. Addition and substraction circuit 28 adds or subtracts externally set data 1 and data 2 from circuits 34 or 35 to or from the data selected by memory selector 24 in response to the operation of external switches 30 and 31. Data selectors 61, 62, 63, 64 and 65 select an output from addition and subtraction circuit 28 and an output from the A-D converter circuit (including A-D converter 10, counter 13 and latch 14). Circuitry comprising latch circuit 55, calculation circuit 56, segment decoder 59 and segment display 60, calculates an exposure value from the outputs of data selectors 61, 62, 63, 64 and 65, ASA information and TIME information and displays the results of the calculation. Indicating units 69 and 70 light up in response to the operation of external switches 30 and 31. Counter block 17 counts an input from external switch 15. Threshold detector circuit 25 determines whether or not an output from counter block 17 exceeds a correct value. Detector circuit 26 determines that no input data from addition and substraction circuit 28 exists. Indicating circuit 71 indicates the outputs from circuits 25 and 26.

The image of an object passing through objective lens 1 is projected to eye 5 of a photographer through mirrors 2 and 3, as well as eyepiece 4. The image of the object is also projected to silicon photocell 7 through diaphragm 6 which limits the angle of acceptance to one degree.

Operational amplifier 8 connects both terminals of silicon photocell 7 across a pair of input terminals. Logarithmic conversion diode 9 is connected between one input terminal and one output terminal of operational amplifier 8. An analog output from a photoelectric conversion circuit comprising silicon photocell 7, operational amplifier 8 and logarithmic conversion diode 9 is a voltage proportional to the logarithm of the brightness of an object image incident upon silicon photocell 7, i.e., a voltage corresponding to luminance Bv of the measured part of an object.

The analog output is converted into a digital output by A-D converter 10 and counter 13 in the subsequent stage. A pulse appears at A-D conversion terminating signal terminal 12 every time A-D converter 10 completes an A-D conversion. Latch circuit 14 latches the contents of counter 13 when an A-D conversion terminating signal is received.

Normally opened switch 15 is interlocked with a memory button. Memory counter block 17 counts the number of memory operations. Normally opened switch 18 is interlocked with a reset button, and the on-off signal thereof is a reset signal for memory counter block 17. Memory circuit block 21 includes two memory circuits, first memory circuit 22 and second memory circuit 23.

Memory selector block 24 selects first memory circuit 22 or second memory circuit 23 in response to a signal received from counter block 17. Memory-threshold detector circuit 25 generates a signal when memory switch 15 is further turned ON with the count number of the counter block 17 being "2", and causes error display 71 to light up through OR gate 27.

Normally opened S-switch 30 is interlocked with a shadow-emphasis operational switch. Normally opened H-switch 31 is interlocked with a highlight-emphasis operational switch. The on-off signals of S-switch 30 and H-switch 31 are used as a signal for actuating addition and subtraction circuit 28. Data input devices 34 and 35 (hereinafter called first data circuit 34 and second data circuit 35), such as digital switches, set a numeral to be added or subtracted by addition and subtraction circuit 28. These data may be optionally set by a photographer in accordance with the latitude of a film in use or may be predetermined to generate a constant value output.

An addition-subtraction terminating signal from terminal 29 of addition and subtraction circuit 28 is input to data selector 61 comprising AND gates 40 and 41 or OR gate 42. Another input to data selector 61 is a signal generated, when A-D conversion is completed, from A-D converter 10 through delay circuit 68. Furthermore, the data from memory selector 24 calculated along with a value from first data circuit 34 or second data circuit 35 in the addition and subtraction circuit 28 become respective inputs to data selectors 62, 63, 64 and 65, respectively. Other respective inputs to data selectors 62, 63, 64 and 65 are outputs from latch circuit 14. Data selectors 61, 62, 63, 64 and 65 select respective inputs connected to addition and subtraction circuit 28 when either S-switch 30 or H-switch 31 is turned ON, and select an input from respective inputs connected to A-D converter 10 and latch circuit 14 when S-switch 30 and H-switch 31 are both turned OFF.

The signals selected by data selectors 61, 62, 63, 64 and 65 are input to latch circuit 55 as latch signals. ASA setting section 57 sets the film speed (ASA). TIME setting section 58 sets exposure time information. Switch 67 is interlocked with a slide switch for selecting Ev and the F-No. AND gate 66 controls the information received from TIME setting section 58 in response to a signal from slide switch 67. Slide switch 67 is replaceable with a pushbutton switch which allows the alternative changeover of the F-No and Ev by using a flip-flop. Calculation circuit 56 performs the calculation of an output from latch circuit 55, along with film speed (ASA) from ASA setting section 57 and exposure time information from TIME setting section 58. Segment decoder 59 segmentally displays the calculation results of calculation circuit 56 by means of segment display unit 60.

Memory zero detector circuit 26 generates a signal for lighting error display 71 when S-switch 30 or H-switch 31 is turned ON with the output from memory counter block 17 zero.

S-display 69 lights up when S-switch 30 is closed, while H-display 70 lights up when H-switch 31 is closed.

During light measurement, the light paasing through objective lens 1 and diaphragm 6 is converted into a voltage by a photoelectric conversion circuit consisting of silicon photocell 7, operational amplifier 8 and logarithmic conversion diode 9. The voltage is proportional to the logarithm of the brightness of light incident on silicon photocell 7, i.e., a voltage corresponding to luminance Bv of the measured part of an object. A-D converter 10 converts that voltage into a corresponding number of pulses, which are counted by counter 13. Latch 14 receives an A-D conversion terminating signal from output terminal 12 of A-D converter 10 upon completion of counting, and transfers the digital data of counter 13 to latch 14.

If S-switch 30 and H-switch 31 are not turned ON at this time, the output of OR gate 37 is set at a "Low" level, which is inverted by inverter 38, whereby the outputs of latch 14 become respective inputs to latch circuit 55 through data selectors 62, 63, 64 and 65. The A-D conversion terminating signal of A-D converter 10 is transmitted through delay circuit 68 and data selector 61 as an input to latch circuit 55, and the outputs of latch 14 are timely held by latch circuit 55. The digital data corresponding to luminance Bv of the measured part of an object held in latch circuit 55 receives film speed (ASA) from ASA setting section 57 and is converted into an Ev value by calculating circuit 56, the contents thereof being segmentally decoded by segment decoder 59 and displayed by segment display 60. Also, when slide switch 67, is closed, calculating circuit 56 receives film speed (ASA) from ASA setting section 57 and exposure time information from TIME setting section 58 to calculate an F-No value. The result of this calculation is digitally displayed by segment display 60. This results in the segment display of an exposure value or F-number corresponding to the luminance of an object in a very narrow acceptance angle. With S-switch 30 and H-switch 31 turned OFF, as described above, ordinary spot-light measurement is performed. Therefore, when an object is photographed at the exposure value on display, the spot-light-measured part of an object is reproduced in the center of a film latitude (i.e., in neutral density).

The following is required to obtain an exposure value if the spot-light measured part of an object is desired to be reproduced at the upper end of the film latitude (i.e., as a highlight part). With a required part of an object set for light measurement, memory switch 15 is pressed ON (closed). With memory switch 15 ON, "1" is set on memory counter block 17, whereby a light measuring value under the above condition is stored in first memory circuit 22 inside memory circuit 21. At this time, since "1" is set in memory counter block 17, memory selector circuit 24 selects the contents of first memory circuit 22. H-switch 31 is then turned ON (closed). This causes the contents of first memory circuit 22 selected by memory selector circuit 24 to be loaded into addition and subtraction circuit 28, which in turn detects that H-switch 31 is ON, and subtracts contents K1 set in second data circuit 35 from the loaded contents. Value K1 to be set in second data circuit 35 corresponds to approximately one-half of the film latitude. The value of first memory 22 after subtraction of value K1 by addition and subtraction circuit 28 is input to latch circuit 55 through data selectors 62, 63, 64 and 65 since the output of OR gate 37 is at a "High" level. Furthermore, an addition-subtraction terminating signal appearing at output terminal 29 of addition and subtraction circuit 28 is transmitted through data selector 61 as a latch signal input to latch circuit 55. With the input of the addition-subtraction terminating signal to latch circuit 55, the outputs of addition and subtraction circuit 28 selected by data selectors 62, 63, 64 and 65 are held by latch circuit 55. The contents held by latch circuit 55 are then converted by calculation circuit 56 into an Ev value or an F-No value for display by segment display 60. Also, since H-switch 31 is turned ON, H display 70 is caused to light up. Photography for an object at the exposure value indicated by segment display 60 reproduces the initially spot-light-measured part of the object at the upper end of the film latitude (i.e., as a highlight part).

However, the following is required to obtain an exposure value if the spot-light-measured part of an object is desired to be reproduced at the lower end of a film latitude (i.e., as a shadow part). Similar to the above description, memory switch 15 is turned ON with the aiming and measuring of a desired part of an object. (Memory counter block 17 is assumed to have been pre-reset by switch 18.) This causes "1" to be set in memory counter block 17, and a light measuring value to be stored in first memory circuit 22 inside memory circuit 21. Also, since the value set in memory counter block 17 is "1", the contents of first memory circuit 22 are selected by memory selector circuit 24, similar to the above described operation. Under this condition, S-switch 30 is turned ON (closed). This causes the contents of first memory circuit 22 to be loaded into addition and subtraction circuit 28, and at the same time, contents K2 set in first data circuit 34 is added to the contents of first memory 22 and loaded into addition and subtraction circuit 28. Value K2 to be set in first data circuit 34 is about half of the film latitude. The contents after addition by addition and subtraction circuit 28 are held by latch circuit 55 through data selectors 62, 63, 64 and 65 as timely, as an addition-subtraction terminating signal generated from output terminal 29 of addition and subtraction circuit 28 since the output of OR gate 37 is at a "High" level. Calculation circuit 56 converts the held contents into an exposure value for indication by segment display 60. Also, since S-switch 30 is turned ON, S-display 69 is caused to light up. Thus, photography for an object at the exposure value indicated by segment display 60 reproduces the initially spot-light-measured part of the object at the lower end of the film latitude (i.e., as a shadow part).

As is clear from the above, an exposure value for reproducing the spot-measured part of an object as a highlight part is obtained when H-switch 31 is closed, while an exposure value for reproducing the spot-measured part of an object as a shadow part is obtained when S-switch 30 is closed. Consequently, when a part of an object with high luminance is spot-light-measured and H-switch 31 is closed, a photograph, in which the measured high luminance part of the object becomes the highlight part of the print with other parts of lower luminances distributed with corresponding densities within a film latitude, is possible. When a part with low luminance is light-measured and S-switch 30 is closed, the measured part becomes the shadow part of the print with other parts of higher luminances distributed within the film latitude.

Two memory circuits 22 and 23 are provided in memory circuit 21 for the following reasons. Assume that a light measuring value for any required part of an object of high or low luminance has already been stored in first memory circuit 22. Next, if the light measuring value stored in first memory circuit 22 is of a high luminance part of an object, another part of a low luminance is measured, and memory switch 15 is turned ON again. This causes a binary "2" to be set in memory counter block 17. Memory circuit 21 compares the contents of first memory circuit 22 which is already stored with the contents to be newly stored and stores the light measuring value for high luminance part in first memory circuit 22 and the light measuring value for low luminance part in second memory circuit 21. If the contents stored first in first memory circuit 22 are of a low luminance part, memory circuit 21 shifts the contents of second memory circuit 23 and stores the second light-measured contents of a high luminance part in first memory circuit 22, so that the light-measured value of a low luminance point may be stored in second memory circuit 23. Assume that S-switch 30 is turned ON at this time. Memory selector circuit 24 is arranged to select the contents of second memory circuit 23 as an input to addition and subtraction circuit 28 only when the contents of memory counter block 17 are binary "2" and S-switch 30 is turned ON. Therefore, when H-switch 31 is turned ON, memory selector circuit 24 operates so that the contents of first memory circuit 22 are input to addition and subtraction circuit 28. With S-switch 30 ON, addition and subtraction circuit 28 adds the contents of first data circuit 34 to those of second memory circuit 23. The added contents are segmentally displayed as an exposure value through data selectors 62, 63, 64 and 65, latch circuit 55 and calculation circuit 56. Similarly, with H-switch 31 ON, addition and subtraction circuit 28 subtracts the contents of second data circuit 35 from those of first memory circuit 22. The results are segmentally displayed as an exposure value through data selectors 62, 63, 64 and 65, latch circuit 55 and calculation circuit 56.

Thus, the luminance of a high luminance part of an object is stored in first memory circuit 22 and that of a low luminance part of an object in second memory circuit 23, respectively. In this condition if an exposure value obtained by turning S-switch 30 ON indicates a value corresponding to a higher luminance than that obtained by turning H-switch 31 ON, this means that the measured high luminance and the measured low luminance are both included in the film latitude. Consequently, if an exposure value is selected between the exposure values obtainable when S-switch 30 and H-switch 31 are turned ON, respectively, both the measured high and low luminance parts of the object are reproduced within the film latitude.

However, when an exposure value obtained by turning S-switch 30 ON indicates a value corresponding to a lower luminance than that obtained by turning H-switch 31 ON, means that the range between the high and low luminances is wider than the film latitude. Therefore, it becomes necessary to select an exposure value obtained with S-switch 30 ON if a low luminance part of an object is considered to be significant by a photographer, or to select an exposure value obtained with H-switch 31 ON if a high luminance part is significant.

Thus, when first memory circuit 22 and second memory circuit 23 are used, it is possible to determine whether the difference in luminance between the measured high and low luminance parts of an object stays within the film latitude range, thereby providing further information necessary for photography.

Figure 2:
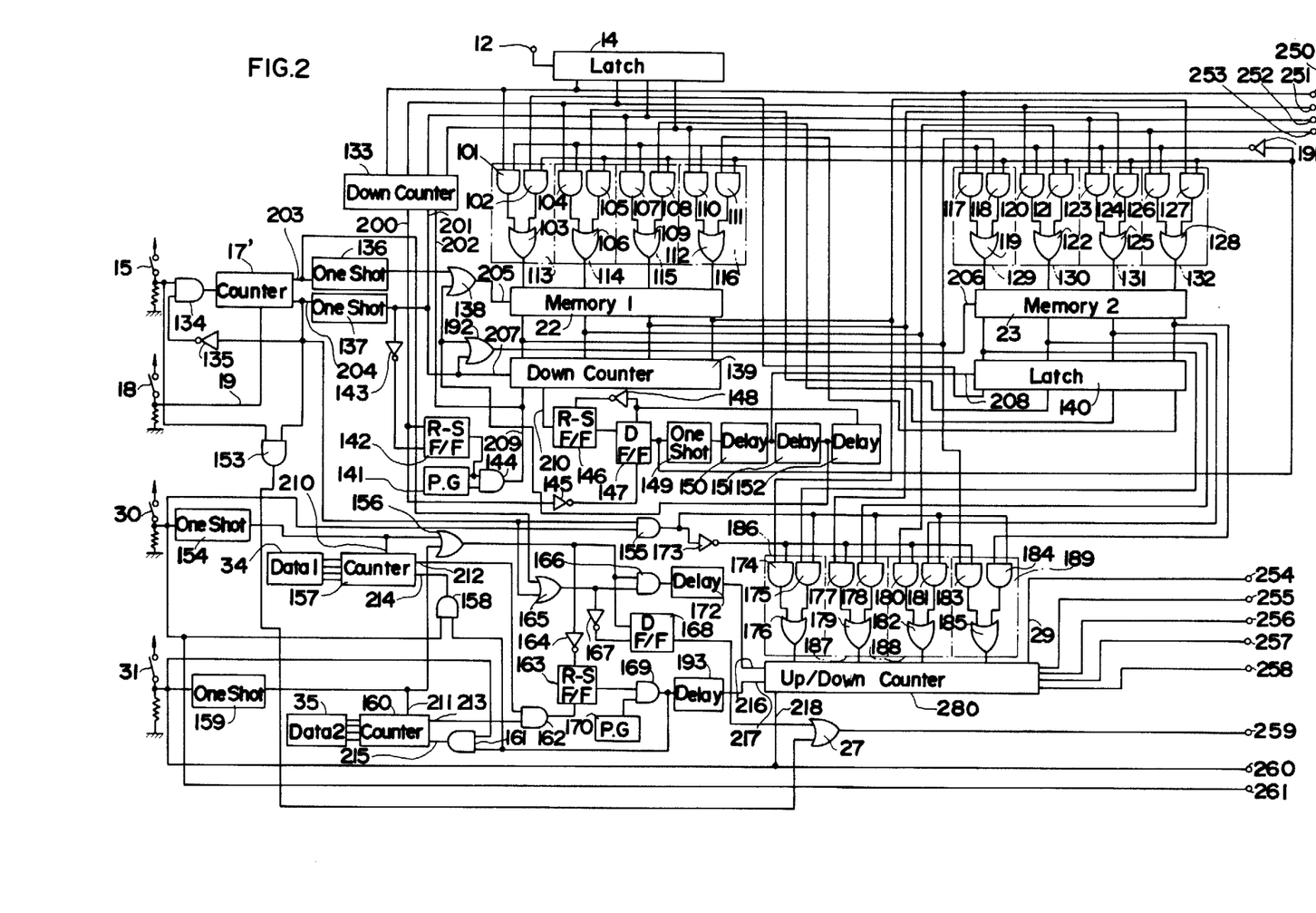
FIG. 2 is a detailed circuit schematic of the first embodiment in FIG. 1.

Shown in FIG. 2 are detailed circuits for counterblock 17, memory block 21, memory selector circuit 24, addition and subtraction circuit 28, memory-over detection circuit 25 and memory zero detection circuit 26 in FIG. 1.

Memory counter block 17 consists of AND circuit 134, inverter 135 and counter 17'. Memory-over detection circuit 25 comprises AND circuit 153, and memory zero detection circuit 26 consists of OR circuit 165, inverter 167 and D flip-flop 168. Memory selector circuit 24 is composed of AND circuit 155, inverter 173 and data selectors 186 through 189. Memory block 21 includes data selectors 113 through 116, 129 through 132, inverters 143, 145, 148 and 191, OR circuits 138 and 192, AND circuit 144, R-S flip-flop 146, D flip-flop 147, monostable circuits 136, 137 and 149, delay circuits 150, 151 and 152, pulse generator 141, down counters 133 and 139, memory circuits 22 and 23, and latch circuit 140. Furthermore, addition and subtraction circuit 28 includes inverters 164, 167 and 173, AND circuits 158, 161, 162, 166 and 169, OR circuits 156 and 165, monostable circuits 154 and 159, delay circuits 172 and 193, pulse generator 170, R-S flip-flop 163, down counters 157 and 160, and up/down counter 280.

In greater detail, the outputs of latch 14 are respective inputs to one side of each of data selectors 113, 114, 115, 116, 129, 130, 131 and 132 which are composed of AND gates 101, 102, 104, 105, 107, 108, 110, 111, 117, 118, 120, 121, 123, 124, 126 and 127 and OR gates 103, 106, 109, 112, 119, 122, 125 and 128. Also, the outputs of latch 14 are inputs to down counter 133. Also, the outputs of latch 14 are input through terminals 250 to 253 to respective ones of data selectors 62 to 65 shown in FIG. 1. Load terminal 201 of down counter 133 receives a pulse to load the output of latch 14 therein. Clock terminal 202 of down counter 133 receives a train of clock pulses, which actuates down counter 133 to count down the contents loaded therein. Borrow terminal 200 of down counter 133 generates a negative pulse when the contents loaded into down counter 133 are counted down to become negative.

Memory counter 17' counts the number of times memory switch 15 is turned ON (closed). The output terminals of memory counter 17' are labeled 203 and 204, and output terminal 203 is "High" when memory counter 17' counts once, while output terminal 204 is "High" when memory counter 17' counts twice. Inverter 135 and AND gate 134 function so that no signal is transmitted to memory counter 17' when memory switch 15 is turned ON more than three times. Reset signal 19 resets memory counter 17', causing output terminals 203 and 204 thereof to become "Low".

Monostable circuit 136 is connected through OR gate 138 to latch terminal 205 of first memory circuit 22. When a pulse is generated from monostable circuit 136, a signal from data selectors 113, 114, 115 and 116 is stored in first memory circuit 22.

Monostable circuit 137 generates an output which is connected through load terminal 207 to down counter 139 and also through OR gate 192 to latch terminal 206 of second memory circuit 23. When a pulse is generated from monostable circuit 137, the output of first memory circuit 22 is loaded into down counter 139. Also, when a pulse is generated from monostable circuit 137, an output from data selectors 129, 130, 131 and 132 is also stored in second memory circuit 23.

Furthermore, the output of monostable circuit 137 is connected through inverter 143 to the set terminal of R-S flip-flop 142 (hereinafter R-SF/F 142). R-SF/F 142 controls the gating of output pulses from pulse generator 141 through AND gate 144. R-SF/F 142 is reset by a signal from borrow terminal 200 of down counter 133. The output of pulse generator 141 is connected through AND gate 144 to clock terminal 209 of of down counter 139 and clock terminal 202 of down counter 133.

The output of AND gate 153 is "High" when memory switch 15 is turned ON more than three times, and is generated through OR gate 27 to terminal 259, which is connected to error display 71 of FIG. 1.

The output of first memory circuit 22 is input to down counter 139, as well as to data selectors 129, 130, 131, 132, 186, 187, 188 and 189. The output of second memory circuit 23 is input to latch 140, as well as to data selectors 186, 187, 188 and 189.

Borrow terminal 210 of down counter 139 is connected to the set terminal of R-SF/F 146. D flip-flop (hereinafter DF/F) 147 receives the output of R-SF/F 146 as an input. Connected to the clock terminal of DF/F 147 is borrow terminal 200 of down counter 133 through inverter 145. The output of DF/F 147 is used as a select signal for data selectors 113, 114, 115, 116, 129, 130, 131 and 132.

The output of monostable circuit 149 is input to delay circuit 150. The output of delay circuit 150 is connected to latch terminal 208 of latch circuit 140 such that when a pulse is generated from delay circuit 150, the output of second memory circuit 23 is held by latch circuit 140. The output of latch circuit 140 is input to data selectors 113, 114, 115 and 116. The output of delay circuit 151 is a latch signal of first memory circuit 22 through OR gate 138, and also a latch signal of second memory circuit 23 through OR gate 192. Also, the output of delay circuit 152 is a reset signal of DF/F 147, as well as a reset signal of R-SF/F 146 through inverter 148.

The ON-OFF signal of S-switch 30 is connected from terminal 261 to S-display 69 of FIG. 1, and is a select signal for data selectors 186, 187, 188 and 189 through AND gate 155 and inverter 173. Data selectors 186, 187, 188 and 189 select data from second memory circuit 23 only when S-switch 30 is turned ON (closed) in the case memory counter block 17' counts to two, i.e., when light measuring values are stored in both first memory circuit 22 and second memory circuit 23.

Monostable circuit 154 is connected to load terminal 210 of down counter 157, and loads data from first data circuit 34 therein.

The ON-OFF signal of H-switch 31 is connected from terminal 260 to H-display 70 of FIG. 1, and is an input to up-count or down-count terminal 218 of up-down counter 280.

The output of monostable circuit 159 is input to load terminal 211 of down counter 160, and loads data from second data circuit 35 therein. The outputs of monostable circuits 154 and 159 are gated through OR gate 156, AND gate 166 and delay circuit 172 as an input to load terminal 216 of up-down counter 280, and load the outputs of data selectors 186, 187, 188 and 189 into up-down counter 280.

AND gate 166 controls a load signal input to up-down counter 280 in response to a signal from output terminals 203 and 204 of memory counter 17' through OR gate 165. Also, the output of monostable circuit 154 is a set signal of R-SF/F 163 through OR gate 156 and inverter 164.

The output of R-SF/F 163 controls the gating of oscillation pulses from pulse generator 170 through AND gate 169. The output pulse of pulse generator 170 is connected through AND gate 169 and delay circuit 193 to clock terminal 217 of up-down counter 280. The output pulse of pulse generator 170 through AND gate 169 is also sent through AND 158 to clock terminal 214 of down counter 157, as well as through AND gate 161 to clock terminal 215 of down counter 160.

The output signals of borrow terminals 212 and 213 of down counters 157 and 160, respectively, are a reset signal of R-SF/F 163 through AND gate 162.

Signals from output terminals 203 and 204 of memory counter 17' are input to DF/F 168 through OR gate 165 and inverter 167. DF/F 168 is clocked in response to signals from monostable circuits 154 and 159, thereby causing error display 71 of FIG. 1 to light up through OR gate 27. In more detail, DF/F 168 causes error display 71 to light up when S-switch 30 or H-switch 31 is turned ON without information stored in the memories.

Output terminals 254, 255, 256, 257 and 258 of up-down counter 280 of addition and subtraction circuit 28 enable inputs to data selectors 61, 62, 63, 64 and 65.

The operation of FIG. 2 is as follows. A digital value corresponding to the measured luminance of an object is held by latch circuit 14 in accordance with A-D conversion terminating pulse received at terminal 12. The output of latch circuit 14 is normally digitally displayed as a measured exposure value from terminals 250, 251, 252 and 253 through data selectors 62, 63, 64 and 65, latch circuit 55, operational circuit 56, segment decoder 59 and segment display 60 of FIG. 1.

Assume that a low luminance point to be reproduced on a film is light-measured. A digital value corresponding to the luminance of the low luminance point is held by latch circuit 14. Memory switch 15 is then turned ON (closed). Output terminal 204 of memory counter 17' is initially at a "Low" level, and the ON signal of memory switch 15 is input to memory counter 17', causing output terminal 203 thereof to become "High". The signal from output terminal 203 is converted by monostable circuit 136 into a pulse, and is gated through OR gate 138 as an input to latch terminal 205 of first memory circuit 22. At this time the logic AND and OR gates of data select circuits 113, 114, 115 and 116 select and input the outputs of latch circuit 14.

With a pulse input to latch terminal 205 of first memory circuit 22 from monostable 136, the output contents of latch circuit 14 are held by first memory circuit 22. Thus, the light measuring value of a low luminance point is stored in first memory circuit 22.

The following is a description of a high luminance point. A light measuring value of the high luminance point is digitally held by latch circuit 14. The contents held by latch circuit 14 are transmitted to terminals 250, 251, 252 and 253, and at the same time, input to down counter 133, as well as to data selectors 113, 114, 115, 116, 129, 130, 131 and 132.

With memory switch 15 then ON, an ON signal is sent through AND gate 134 as an input to memory counter 17', which causes output terminals 203 and 204 thereof to become "Low" and "High", respectively. A signal from memory switch 15 is blocked thereafter by the "High" output signal at terminal 204 which is inverted by inverter 135 to block AND gate 134. The "High" level signal at output terminal 204 also causes monostable circuit 137 to generate a pulse which is input to load terminal 201 of down counter 133, into which the output of latch circuit 14 is loaded. Similarly, a pulse from monostable circuit 137 is input to load terminal 207 of down counter 139, and the light measuring value of the low luminance point stored in first memory circuit 22 is loaded into down counter 139. Also, the pulse from monostable circuit 137 is input to latch terminal 206 of second memory circuit 23, and the output of latch circuit 14, i.e., the light measuring value of the high luminance point, is stored in second memory circuit 23 through data selectors 129, 130, 131 and 132.

The output pulse of monostable circuit 137 sets R-SF/F 142 through inverter 143, thereby supplying the oscillation pulse of pulse generator 141 to clock terminals 202 and 209 of down counters 133 and 139, respectively, which count down the loaded contents thereof. In this case, the contents loaded into down counter 139 represent the light measuring value of a low luminance point, while those loaded into down counter 133 represent the light measuring value of a high luminance point. This causes down counter 139 to generate a borrow signal earlier than down counter 133.

The borrow signal of down counter 139 sets R-SF/F 146, causing the input to DF/F 147 to become "High". A borrow signal is generated thereafter from down counter 133, whereby R-SF/F 142 is reset, and a pulse from pulse generator 141 is blocked by AND gate 144.

Also, a borrow signal from down counter 133 is sent through inverter 145 as an input to the clock terminal of DF/F 147, whereby the output of DF/F 147 becomes "High". The output from DF/F 147 is a latch signal of latch circuit 140 through monostable circuit 149 and delay circuit 150, thereby shifting the light-measured contents of the high luminance point stored in second memory circuit 23 to latch circuit 140.

Since the output of DF/F 147 is at a "High" level, data selectors 113, 114, 115 and 116 select an input from latch circuit 140, while data selectors 129, 130, 131 and 132 select an input from first memory circuit 22.

The output pulse of delay circuit 150 is sent through delay circuit 151 and OR gate 138 as an input to latch terminal 205 of first memory circuit 22. This causes first memory circuit 22 to store the contents of latch circuit 140 selected by data selectors 113, 114, 115 and 116, i.e., the light-measured contents of the high luminance point. Similarly, the output pulse of delay circuit 151 is sent through OR gate 192 as an input to latch terminal of second memory circuit 23. This causes second memory circuit 23 to store the contents of first memory circuit 22 selected by data selectors 129, 130, 131 and 132, i.e., the light-measured contents of the low luminance point. The output pulse of delay circuit 151 resets R-SF/F 146 and DF/F 147 through the output of delay circuit 152.

The foregoing has described the memory procedure in which a low luminance point is first light-measured, and a high luminance point is then light-measured. The following description is of a case in which a high luminance point is first light-measured for storage, and a low luminance point is then light-measured for storage.

When a high luminance point is light-measured and memory switch 15 is turned ON, the light-measured contents are stored in first memory circuit 22. Then, a low luminance point is light-measured and with memory switch 15 ON, the light-measured contents are stored in second memory circuit 23 and down counter 133, and the light-measured contents of a high luminance point are loaded into down counter 139.

Next, the size of the light-measured contents for the high luminance point and low luminance point is determined by down counters 133 and 139. In this case, down counter 133 generates a borrow signal earlier than down counter 139, causing the output of DF/F 147 to remain at a "Low" level. As a result, the light-measured contents of the high luminance point are stored in first memory circuit 22, while those of the low luminance point are stored in second memory circuit 23.

Thus, the light-measured contents of the high luminance point are stored in first memory circuit 22 and the low luminance point measurements are stored in second memory circuit 23, regardless of the sequence of light measurements of the high and low luminance points or the sequence of memories.

Next, when S-switch 30 is turned ON (closed), that ON signal is used as a select signal for data selectors 186, 187, 188 and 189 through AND gate 155, since output terminal 204 of memory counter 17' is at a "High" level. This causes data selectors 186, 187, 188 and 189 to select data from second memory circuit 23, i.e., the light-measured contents of the low luminance point.

The ON signal from S-switch 30 actuates monostable circuit 154 to provide an input to load terminal 210 of down counter 157, into which the data from first data circuit 34 is loaded. The output pulse of monostable circuit 154 sets R-SF/F 163 through OR gate 156 and inverter 164. This causes the oscillation pulse of pulse generator 170 to be gated through AND gate 169 as an input to clock terminal 217 of up/down counter 280 through delay circuit 193 as well as through AND gate 158 to clock terminal 212 of down counter 157. The output pulse of monostable circuit 154 is gated through OR gate 156, AND gate 166 and delay circuit 172 as an input to load terminal 216 of up/down counter 280, into which the outputs of data selectors 186, 187, 188 and 189 are loaded.

Since a "Low" potential is supplied through H-switch 31 to terminal 218 of up/down counter 280 at this time, up/down counter 280 counts up the light-measured contents of the low luminance point loaded therein in response to an oscillation pulse from pulse generator 170. Down counter 157 counts down the contents of first data circuit 34 loaded therein in response to an oscillation pulse from pulse generator 170, and when the contents become negative, down counter 157 generates a negative pulse from borrow terminal 212. R-SF/F 163 is reset by a signal from borrow terminal 212 of down counter 157 through AND gate 162, whereby an oscillation pulse from pulse generator 170 is blocked by AND gate 169. In the meantime, up/down counter 280 continues to count up and add the contents of first data circuit 34 to the light-measured contents of the low luminance point loaded therein, at data selector terminals 255, 256, 257 and 258. The added contents are digitally displayed by segment display 60 in FIG. 1. In this case, S-switch 30 is turned ON, causing S-display 70 to remain lit in FIG. 1.

Next, with H-switch 31 ON, the ON signal loads the contents of second data circuit 35 into down counter 160 by the output of monostable circuit 159. The output signal initiated by the ON signal from H-switch 31 of monostable circuit 159 sets R-SF/F 163 through OR gate 156 and inverter 164, thereby supplying the oscillation pulse of pulse generator 170 to clock terminal 217 of up/down counter 280 through AND gate 169 and delay circuit 193. The oscillation pulse of pulse generator 170 is also sent through AND gates 169 and 161 as an input to clock terminal 215 of down counter 160. The output pulse of monostable circuit 159 loads the outputs of data selectors 186, 187, 188 and 189 into up/down counter 280 through OR gate 156, AND gate 166 and delay circuit 172. At this time, S-switch 30 is turned OFF (opened), and a low potential is supplied to the input of AND gate 155, whereby data selectors 186, 187, 188 and 189 select the contents from first memory circuit 22, i.e., the light-measured contents of the high luminance point, and the selected contents are loaded into up/down counter 280.

A high potential is applied to terminal 218 of up/down counter 280, which, in response to the oscillation pulse of pulse generator 170, counts down the light-measured contents of the high luminance point loaded therein. Down counter 160 counts down the contents of second data circuit 35 loaded therein in response to the oscillation pulse of pulse generator 170, and when the loaded contents become negative, a borrow signal is generated from borrow terminal 213, thereby resetting R-SF/F 163 through AND gate 162. This causes an oscillation pulse from pulse generator 170 to be blocked by AND gate 169. Meanwhile, up/down counter 280 counts down the light-measured contents of the high luminance information loaded therein and finally generates at data selector terminals 255, 256, 257 and 258 the contents which are subtracted from those set in second data circuit 35 from the light-measured contents of the high luminance point. The contents generated at data selector terminals 255, 256, 257 and 258 are digitally displayed by segment display 60 in FIG. 1. At this time, H-display 71 lights up upon receipt of an ON signal from H-switch 31.

It should be noted that when S-switch 30 or H-switch 31 is closed while the data are stored only in first memory circuit 22, the output of AND circuit 155 is at a "Low" level, causing no data from second memory circuit 23 to be taken into up/down counter 280.

Figure 3:
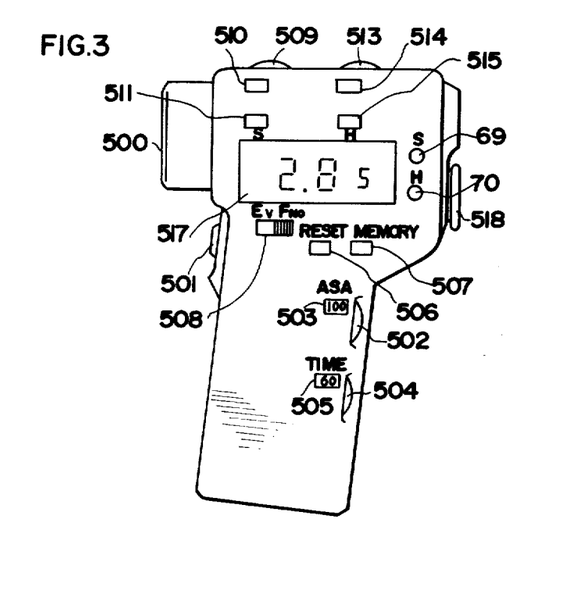
FIG. 3 is an external view of an exposure meter embodying the first embodiment of the present invention.

FIG. 3 is an external view of the first embodiment of the present invention. Included therein are objective lens 500 and light measuring button switch 501. Also included are ASA setting dial 502, ASA value indicating window 503, TIME setting dial 504 and TIME value indicating window 505. Dial 509 for setting first data circuit 34 in FIG. 1 is, for example, variable according to the film in use. Indicating window 510 displayes the data set by dial 509. Pushbutton 511 controls S-switch 30 and pushbutton 515 controls H-switch 31. Dial 513 for setting second data circuit 35 in FIG. 1 is, for example, variable according to the film in use. Indicating window 514 is used to observe the setting of dial 513. Indicator 69 for S-switch 30 lights up when S-switch 30 is turned ON or closed. Indicator 70 for H-switch 31 lights up when H-switch 31 is turned ON or closed. Further included in FIG. 3 are Ev/F-No selector slide switch 508, pushbutton 506 for reset switch 18 and pushbutton 507 for memory switch 15, as well as eyepiece 518 and digital display 517.

Figure 4:
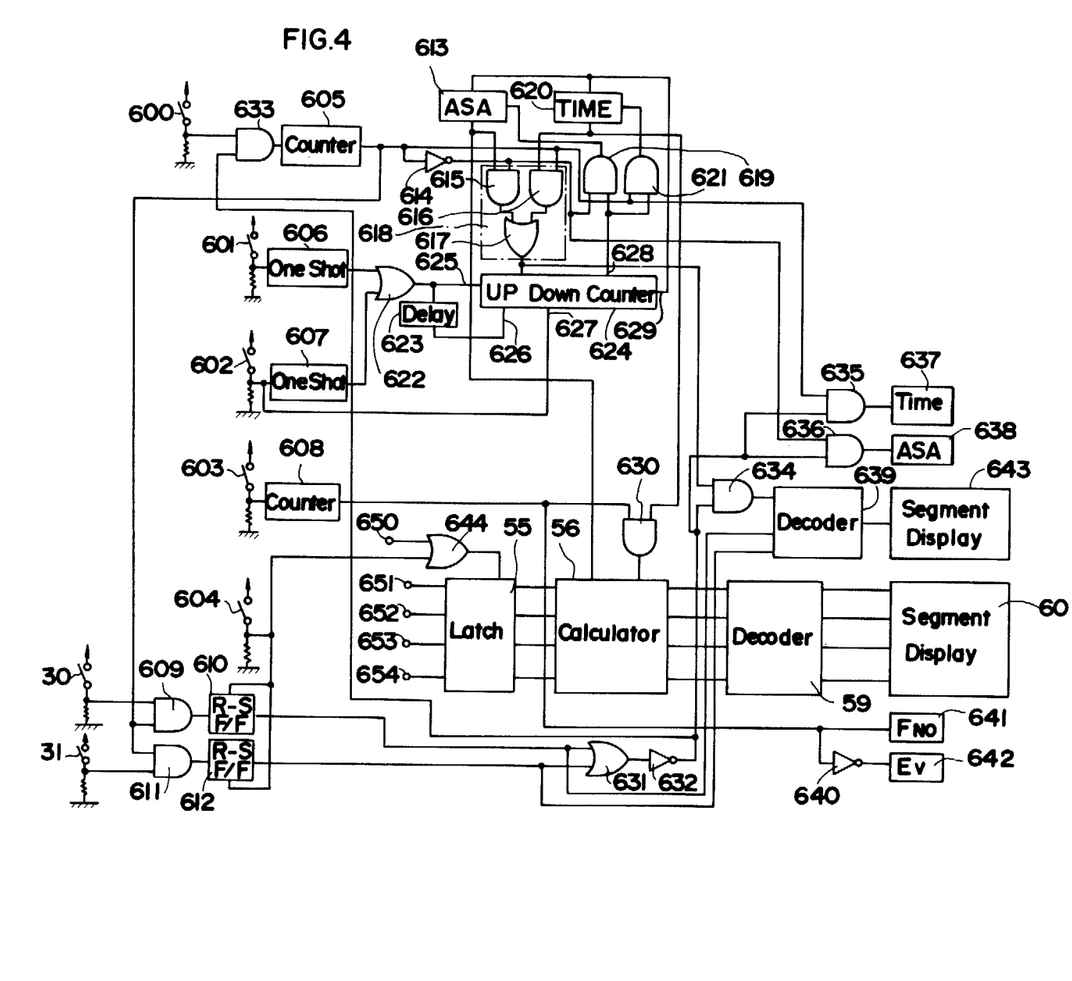
FIG. 4 is a circuit diagram of a second embodiment with a modified indicating unit from the first embodiment of FIG. 1.

FIG. 4 shows a circuit of an indicating unit according to a second embodiment of the present invention, wherein the ASA and TIME setting dials in FIG. 3 are replaced with ASA and TIME setting pushbuttons.

ASA and TIME set values are held by latches 613 and 620, the contents either of which are digitally displayed by segment display 643. The contents indicated by segment display 643, i.e., ASA or TIME, are determined by external switch 600, and the displayed contents are changed by up/down counter 624 in response to the operation of external switches 601 and 602. External switch 603 and counter 608 replace Ev/F-No changeover slide switch 67 in FIG. 1. Display decoder 639 functions so that "S" and "H" are displayed by segment display 643 in response to the operation of S-switch 30 and H-switch 31, in place of S-display 69 and H-display 70 in FIG. 1.

More specifically, normally opened ASA/TIME switch 600 is interlocked with an ASA/TIME changeover button. The output of binary counter 605 is inverted by an ON signal from ASA/TIME switch 600. Latch circuit 613 holds the set ASA information, while latch circuit 620 holds set TIME information. Latch circuits 613 and 620 are set at a constant value when power is on at the main circuitry.

Data selector 618 consists of AND gates 615 and 616 and OR gate 617, and selects the output data of latch circuit 613 from the output of counter 605. The data selected by data selector 618 is input to up/down counter 624.

Normally opened down switch 601 is interlocked with a button which counts down by one the set ASA information in latch circuit 613 or the set TIME information in latch circuit 620.

Normally opened up switch 602 is interlocked with a button which counts up by one the set ASA information in latch circuit 613 or the set TIME information in latch circuit 620.

The ON signal of down switch 601 changes the state of monostable circuit 606 to provide an input to OR gate 622. The ON signal of up switch 602 changes the state of monostable circuit 607 to provide an input to OR gate 622. Up switch 602 is connected to up/down selector terminal 627 of up/down counter 624, which functions as an up counter while up switch 602 is turned ON, and as a down counter while up switch 602 is turned OFF.

The output of OR gate 622 is input to load terminal 625 of up/down counter 624 and loads the data selected by data selector 618 into up/down counter 624. The output of OR gate 622 is delayed by delay circuit 623 as an input to clock terminal 626 of up/down counter 624, which, in response to this signal, counts the contents loaded therein up or down by one. The contents of up/down counter 624 are generated from terminal 629 and stored in latch circuit 613 or 620 selected by data selector 618 by a count terminating signal generated from terminal 628 of up/down counter 624. ASA information, e.g., the contents of latch circuit 613, is counted up or down by up/down counter 624 through data selector 618, and the contents are returned to latch circuit 613 through AND gate 619, and stored therein in response to a count terminating signal.

TIME indicator 637 lights up when the output of counter 605 is at a "High" level. ASA indicator 638 lights up when the output of counter 605 is at a "Low" level. The contents selected by data selector 618 are digitally displayed by segment display 643 through AND gate 634 and display decoder 639.

Latch circuit 55 receives data as an input selected by data selectors 61, 62, 63, 64 and 65 in FIG. 1 through selector terminals 651, 652, 653 and 654.

Exposure value calculator circuit 56 receives as an input an output from latch circuit 55, ASA information set in latch circuit 613 and TIME information set in latch circuit 620 through AND gate 630.

Normally opened Ev/F-No switch 603 is interlocked with an Ev/F-No changeover button. The ON signal of Ev/F-No switch 603 is input to binary counter 608, thereby inverting the output of counter 608.

When the output of counter 608 is at a "Low" potential, TIME information from latch circuit 620 is blocked by AND gate 630. At this time, Ev operation is performed by calculator circuit 56, and the operational result is digitally displayed by segment display 60 through display decoder 59. The output of counter 608 causes Ev display 642 to light up through inverter 640.

Next, Ev/F-No switch 603 is turned ON (closed), and the output of counter 608 becomes "High", whereby TIME information is supplied from latch circuit 620 to operational circuit 56 through AND gate 630, and the F-No is digitally displayed by segment display 60, at the same time, causing F-No display 641 to light up.

AND gates 609 and 611 block ON signals from S-switch 30 and H-switch 31, respectively when the output of counter 605 is at a "Low" level, namely, when ASA display 638 lights up. S-switch 30 and H-switch 31 become effective when TIME display 637 lights up by the output from counter 605.

The output of R-SF/F 610 is set by the ON signal of S-switch 30 which is "High". The output of R-SF/F 610 blocks a select signal of data selector 618 by AND gate 634 through OR gate 631 and inverter 632.

The output of inverter 632 controls AND gates 635 and 636, whereby TIME display 637 and ASA display 638 light up. Furthermore, the output of R-SF/F 610 is input to decoder 639, which in turn generates a signal by which the character "5" lights up at segment display 643. The output of inverter 632 controls AND gate 633, thereby blocking the ON signal of ASA/TIME switch 600 to counter 605.

R-SF/F 612 is set by the ON signal of H-switch 31, whereby the output of R-SF/F 612 becomes "High". The output of R-SF/F 612 is input to decoder 639, which provides to segment display 643 a signal by which character "H" lights up at segment display 643.

Normally opened Recall switch 604 is interlocked with a button switch which releases shadow-emphasis operations or highlight-emphasis operations. The ON signal of switch 604 resets R-SF/Fs 610 and 612.

The operation of the circuitry in FIG. 4 is as follows. With power ON, initial ASA information is set in latch circuit 613, while initial TIME information is set in latch circuit 620. Also, the outputs of counters 605 and 608 are at a "Low" potential. ASA display 638 lights up by the output of counter 605. In addition, data selector 618 selects the data from latch circuit 613, i.e., initial ASA information for the digital display, e.g., "100" by segment display 643.

Since the output of counter 605 is at a "Low" potential at this time, the ON signal from S-switch 30 or H-switch 31 is blocked by AND gates 609 and 611. Also, the output of counter 608 is at a "Low" potential, whereby TIME information from latch circuit 620 is blocked by AND gate 630.

The light-measured contents are thereafter input to latch circuit 55 through terminals 651, 652, 653 and 654, calculated by calculator circuit 56 as an Ev value, and the Ev value of the light-measured contents is digitally displayed by segment display 60. At this time, Ev display 642 lights up in response to the output of counter 608 through inverter 640.

Next, with down switch 601 ON, the ON signal thereof changes the state of monostable circuit 606 and the output thereof is gated by OR gate 622 as an input to load terminal 625 of up/down counter 624, whereby the ASA information selected by data selector 618 from latch circuit 613 is loaded into up/down counter 624. The output pulse from monostable circuit 606 is gated by OR gate 622 and delay circuit 623 as an input to clock terminal 626 of up/down counter 624. Since a low potential is supplied to terminal 627 at this time, up/down counter 624 counts the loaded contents down by one in response to an input pulse from terminal 626. The counted down contents are input to latch circuit 613 and are held thereby in response to a count terminating signal generated from terminal 628 of up/down counter 624 through AND gate 619. The ASA information of latch circuit 613 is counted down and displayed by segment display 643 through data selector 618, AND gate 634 and decoder 639.

Furthermore, the counted down ASA information is input to calculator circuit 56, which, in turn, calculates the light-measured contents held by latch circuit 55, whereby the contents are digitally displayed by segment display 60.

When up switch 602 is turned ON, the ASA information of latch circuit 613 is counted up by up/down counter 624, and the contents of latch circuit 613 are replaced with the counted up contents. The ASA display contents of segment display 643 and EV display contents of segment display 60 vary in accordance with the counted up ASA information.

When ASA/TIME switch 600 is turned ON, the ON signal thereof is gated by AND gate 633 as an input to counter 605, whose output becomes "High". This causes data selector 618 to select the contents from latch circuit 620, i.e., TIME information, as an input to up/down counter 624. The select output of data selector 618 is displayed by segment display 643 as a TIME value through AND gate 634 and decoder 639. The output of counter 605 causes TIME display 637 to light up, and ASA display 638 to go out.

With down switch 601 ON, the TIME information from latch circuit 620 is counted down by one by up/down counter 624, in a similar manner to the ASA information, and the contents of latch circuit 620 are replaced with the counted down contents. The TIME display contents of segment display 643 vary in accordance with the counted down TIME information.

WIth up switch 602 ON, the TIME information of latch circuit 620 is counted up by one, and the counted up TIME information is digitally displayed by segment display 643.

Next, when Ev/F-No switch 603 is turned ON, the output of counter 608 becomes "High" in response to the ON signal of Ev/F-No switch 603, whereby the TIME information from latch circuit 620 is supplied to calculator circuit 56. This causes calculator circuit 56 to receive the light-measured contents from latch circuit 55 for an operation of F-No, and the light-measured contents from latch circuit 55 are displayed by segment display 60. The output of counter 608 causes F-No display 641 to light up and Ev display 642 to go off.

When F-No display 641 remains lit, down switch 601 or up switch 602 is turned ON, whereby the TIME value on display by segment display 643 is varied, while the F-No value on display by segment display 60 is varied in accordance with the counted up or down TIME information.

Next, when S-switch 30 is turned ON, the ON signal thereof sets R-SF/F 610 through AND gate 609 since the output of counter 605 is at a "High" potential. The output of R-SF/F 610 blocks TIME information from data selector 618 by AND gate 634 through OR gate 631 and inverter 632. The output of inverter 632 controls AND gates 635 and 636, thereby causing TIME display 637 and ASA display 638 to go off.

The output of R-SF/F 610 is input to decoder 639, whereby the TIME value on display by segment display 643 goes out, and character "S" lights up. With S-switch 30 ON, the contents calculated by the circuitry in FIG. 2 are displayed by segment display 60.

When H-switch 31 is turned ON, R-SF/F 612 is set by the ON signal thereof, whereby TIME display 637 and ASA display 638 go out, and character "H" lights up at segment display 643. Also, the calculated contents are displayed by segment display 60 when H-switch 31 is turned ON as described with respect to the circuitry of FIG. 2.

At this time, the ON signal of ASA/TIME switch 600 is blocked by AND gate 633, whereby the output of counter 605 remains at a "High" potential.

Furthermore, when down switch 601 or up switch 602 is turned ON, the TIME information held by latch circuit 620 is counted down or counted up in accordance with the operation of down switch 601 or up switch 602. This causes a highlight-emphasis operational value, determined by turning H-switch 31 ON, to vary while on display by segment display 60 in accordance with the TIME information of latch circuit 620. The above operation is performed to change the F-No value on display by segment display 60 to a required F-No value. With RECALL switch 604 ON thereafter, R-SF/F 610 and 612 are reset by the ON signal of RECALL switch 604, and a TIME value from the TIME information held by latch circuit 620 is displayed by segment display 643, and TIME display 637 lights up. The light-measured contents held by latch circuit 14 in FIG. 1 are displayed by segment display 60.

With the camera shutter speed set in accordance with the TIME value of segment display 643 and the camera diaphragm aperture value set in accordance with the F-No value of segment display 60, an object is photographed, resulting in the reproduction of a high luminance point at the end of the film latitude, as described in FIG. 1.

Thus, indicating the ASA value and TIME value, as well as S-display and H-display on the same segment display 643 makes it possible to reduce the number of segment display devices.

Also, since the ASA display and the TIME display are off during S-display and H-display, the ON signal of ASA/TIME switch 600 is blocked by AND gate 633 while S-display and H-display are indicated by segment display 643 so that the ASA information may remain unchanged even by actuation of down switch 601 and up switch 602 when ASA/TIME switch 600 is erroneously turned ON.

Furthermore, the ON signals of S-switch 30 and H-switch 31 are blocked by AND gates 609 and 611 while ASA display 637 lights up.

Figure 5:
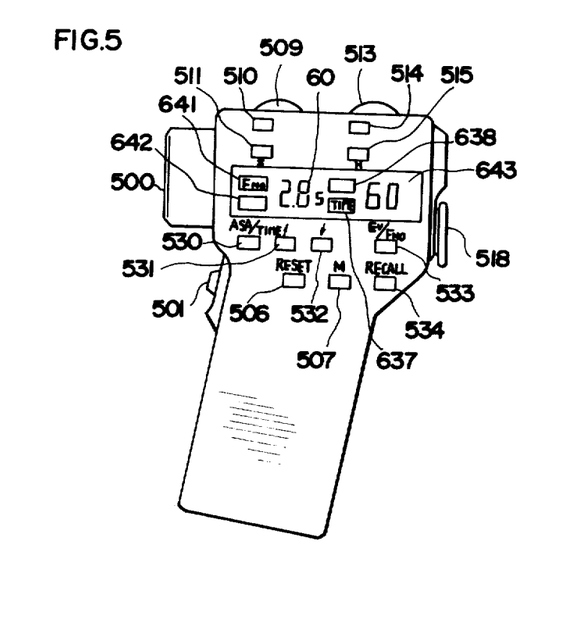
FIG. 5 is an external view of an exposure meter embodying the second embodiment.

FIG. 5 is an external view of the second embodiment of FIG. 4. Included therein are ASA/TIME changeover button 530, ASA or TIME value up button 531, ASA or TIME value down button 532. Also included are Ev/F-No changeover button 533, shadow-emphasis operation or highlight-emphasis operation release button 534, F-No display 641, Ev display 642, ASA display 638 and TIME display 637. Further included are exposure value display 60 and ASA value, TIME value, S and H display 643. The remaining elements are identical to those described previously with respect to FIG. 3.

As is obvious from the foregoing, photography according to the present invention is extremely simple at correct exposure in accordance with a variety of intended photographic compositions. And, the luminance distribution range of interest is reproducible as a properly corresponding density distribution. Further, according to the present invention, the selection of the correspondence of film latitude to density distribution is made in case the luminance distribution of an object is narrower than the range of the film latitude, thereby making an overall bright or dark photograph possible.

What is claimed is:

1. A photographic spot measuring device for determining a film exposure for an object relative to a film latitude, said film latitude capable of reproducing various parts of the object with respective possible densities between a pair of density limits, comprising:
   means for selectively measuring the luminance of a desired part of the object within a limited acceptance angle;
   means for producing a light measuring signal in response to said measuring means; and
   means responsive to said producing means for generating a limit exposure signal to effect an exposure of a film in which the measured part of the object is reproduced on said film with one of said pair of density limits.

2. A photographic spot measuring device according to claim 1, further comprising means for providing an additional signal related to the range of film latitude, and wherein said generating means includes means for calculating said limit exposure signal in accordance with said light measuring signal and said additional signal.

3. A photographic spot measuring device according to claim 2, wherein said means for producing includes means for producing said light measuring signal as a signal to effect an exposure in which the measured part of the object is reproduced on the film with the middle density in the film latitude, and wherein said additional signal is of a value corresponding to about a half of the range of the film latitude, whereby the limit exposure signal related to the limit density is calculated from said light measuring signal related to the middle density and said additional signal related to approximately one-half of the film latitude range.

4. A photographic spot measuring device according to claim 3 further comprising means for selecting between said limit exposure signal and said light measuring signal as a final output of the device, whereby the device is further capable of a conventional mode of operation to indicate an output relating to the middle density when said light measuring signal is selected, in addition to the first mentioned mode of operation to indicate an output relating to the limit density when said limit exposure signal is selected.

5. A photographic spot measuring device according to claim 4 further comprising means for selectively determining whether said limit exposure signal is to effect the maximum density or minimum density in the film latitude, and means for controlling said calculating means whether said additional signal is substracted from or added to said light measuring signal in response to said determining means in calculating said limit exposure signal.

6. A photographic spot measuring device according to claim 5, wherein said additional signal has a pair of values, one of which is for exclusive use in subtracting from said light measuring signal, while the other is for exclusive use in adding to the same.

7. A photographic spot measuring device according to claim 6, wherein said values of said additional signal are adjustable in accordance with a change in the film in use.

8. A photographic spot measuring device according to claim 7 further comprising means for storing said light measuring signal.

9. A photographic spot measuring device, comprising:
   means for selectively measuring the luminance of a desired part of an object within a limited acceptance angle;
   means for producing a light measuring signal in response to said measuring means;
   means for providing an additional signal corresponding to about a half of the film latitude range; and
   means for calculating an exposure signal to determine an exposure to the desired part of the object in accordance with said light measuring signal and said additional signal.

10. A photographic spot measuring device according to claim 9, further comprising means for selecting between first and second modes to generate a final output signal, the final output signal being generated in response to said light measuring signal in said first mode, and in response to said exposure signal in said second mode.

11. A photographic spot measuring device according to claim 10 further comprising means for indicating the final output signal.

12. A device as in claim 11 further comprising means for generating signals corresponding to film speed and exposure time data, and respective switching means for supplying said film speed and exposure time data signals to said means for calculating.

13. A device as in claim 12 further comprising respective first and second manually operated switch means effective in said second mode for providing a highlight or a shadow exposure, respectively, and first memory means for storing said light measuring signal, said calculating means including an adder-subtractor circuit, wherein closure of said first manually operated switch means causes said additional signal to be subtracted from the contents of said first memory circuit by said adder-subtractor circuit for calculating Ev or F-No exposure signals such that said exposure signals conform to highlight exposure, and closure of said second manually operated switch means causes the contents of said first memory circuit to be added to said additional signal by said adder-subtractor circuit to provide Ev or F-No exposure signals for shadow exposure.

14. A device as in claim 13 further comprising a second memory circuit whereby low luminance and high luminance portions of an object can be respectively simultaneously stored in said first and second memory means such that said calculating means can generate exposure signals for both highlight and shadow exposure modes of operation.

15. A device as in claim 14 wherein said means for providing an additional signal includes respective first and second data circuits each respectively storing data representative of a specified portion of the film latitude and wherein, with said first manually operated switch means closed, the data from said second data circuit is subtracted from the contents of said first memory circuit by said adder-subtractor circuit and, with said second manually operated switch means closed, the data from said first data circuit is added to the contents of said second memory circuit by said adder-subtractor circuit.

16. A device as in claim 15 wherein said means for selecting includes logic circuitry interconnecting said adder-subtractor circuit.

17. A device as in claim 16 wherein said means for indicating includes respective first and second indicators for respectively indicating a highlight or shadow exposure in accordance with the closure of said first or second manually operated switch means.

18. A photographic spot measuring device, comprising:
   means for selectively measuring the luminance of a desired part of an object within a limited acceptance angle;
   means for producing a light measuring signal in response to said measuring means;
   means for providing an additional signal related to the range of film latitude;
   means responsive to said light measuring signal and said additional signal for generating a final output signal indicative of an exposure of the desired part of the object; and
   means for controlling said generating means to select between a first mode of operation in which the measured part of the object is reproduced on a film with a maximum density possible in the film latitude in accordance with said final output signal, a second mode of operation in which the measured part of the object is reproduced on a film with a minimum density possible in the film latitude in accordance with said final output signal, and a third mode of operation in which the measured part of the object is reproduced on a film with a middle density possible in the film latitude in accordance with said final output signal.

* * * * *